US008775581B2

(12) United States Patent
Durai et al.

(10) Patent No.: US 8,775,581 B2
(45) Date of Patent: Jul. 8, 2014

(54) CONTROLLING LIFETIME OF SERVER ADD-INS

(75) Inventors: Ponnusamy Jesudoss Durai, Meridan, ID (US); Arutselvan Palanivelu, Meridan, ID (US)

(73) Assignee: iAnywhere Solutions, Inc., Dublin, CA (US)

( * ) Notice: Subject to any disclaimer, the term of this patent is extended or adjusted under 35 U.S.C. 154(b) by 688 days.

(21) Appl. No.: 12/689,959

(22) Filed: Jan. 19, 2010

(65) Prior Publication Data

US 2011/0179152 A1    Jul. 21, 2011

(51) Int. Cl.
*G06F 15/177* (2006.01)

(52) U.S. Cl.
USPC ............ 709/222; 709/221; 709/224; 709/248

(58) Field of Classification Search
None
See application file for complete search history.

(56) References Cited

U.S. PATENT DOCUMENTS

| | | | |
|---|---|---|---|
| 6,498,897 B1 * | 12/2002 | Nelson et al. | 386/243 |
| 7,254,814 B1 * | 8/2007 | Cormier et al. | 718/106 |
| 7,644,120 B2 * | 1/2010 | Todorov et al. | 709/203 |
| 8,200,842 B1 * | 6/2012 | Lau | 709/245 |
| 8,332,493 B2 * | 12/2012 | Rowley et al. | 709/220 |
| 2006/0195899 A1 * | 8/2006 | Ben-Shachar et al. | 726/12 |

* cited by examiner

*Primary Examiner* — Mohamed Ibrahim
(74) *Attorney, Agent, or Firm* — Sterne, Kessler, Goldstein & Fox P.L.L.C.

(57) ABSTRACT

System, method, computer program product embodiments and combinations and sub-combinations thereof for controlling lifetimes of server add-ins are described herein. Embodiments of the invention enable a service module, located at a first server, to externally control lifetime of one or more process add-ins located at a second server. An embodiment includes instantiating the service module at the first server and instantiating, using the service module, a controller add-in at the second server. The service module can instantiate the controller add-in to control the lifetime of (i.e. instantiate or terminate) process add-ins at the second server. In an embodiment, such lifetime control can be performed without shutting down the second server or other operations running on the second server.

20 Claims, 6 Drawing Sheets

CONTROLLING LIFETIME OF SERVER ADD-INS

BACKGROUND

1. Field

Embodiments of the present invention relate to server add-ins and particularly to controlling lifetime of such add-ins.

2. Background Art

Add-ins enable servers and applications to perform tasks that the severs and the applications may not be originally configured to perform.

In network environments, add-ins resident on a hosting server can communicate with other servers. Conventionally, if the other servers need to be shut down for upgrades and other tasks, the server hosting the add-ins needs to be shut down to prevent the add-ins from communicating with the other servers. Because the hosting server is shut down, any other applications that are executing on the hosting server are affected. This may negatively impact the entire network.

Accordingly, systems, methods and computer program products are needed that enable efficient management and control of server add-ins.

BRIEF SUMMARY

Briefly stated, the invention includes system, method, computer program product embodiments and combinations and sub-combinations thereof for controlling lifetime of server add-ins. Embodiments of the invention enable a service module, located at a first server, to externally control the lifetime of one or more process add-ins located at a second server.

An embodiment includes instantiating the service module at the first server and instantiating, using the service module, a controller add-in at the second server. The service module can instantiate the controller add-in to control the lifetime of (i.e. instantiate or terminate) process add-ins at the second server. In an embodiment, such lifetime control can be performed without shutting down the second server or other operations running on the second server.

In this way, when the first server needs to be shut down for upgrades or other tasks or reasons, the second server hosting the process add-ins need not be shut down to prevent the process add-ins from communicating with the first server. Instead, the service module, external to the first server, can terminate the process add-ins as needed. Because the second server need not be shut down, any other applications executing on the second server are not affected. Furthermore, because the service module is located on first server, embodiments of the invention enable external control of add-ins resident at the second server.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present invention and, together with the descrip-tion, further serve to explain the principles of the invention and to enable a person skilled in the relevant art to make and use the invention.

Figure 1:
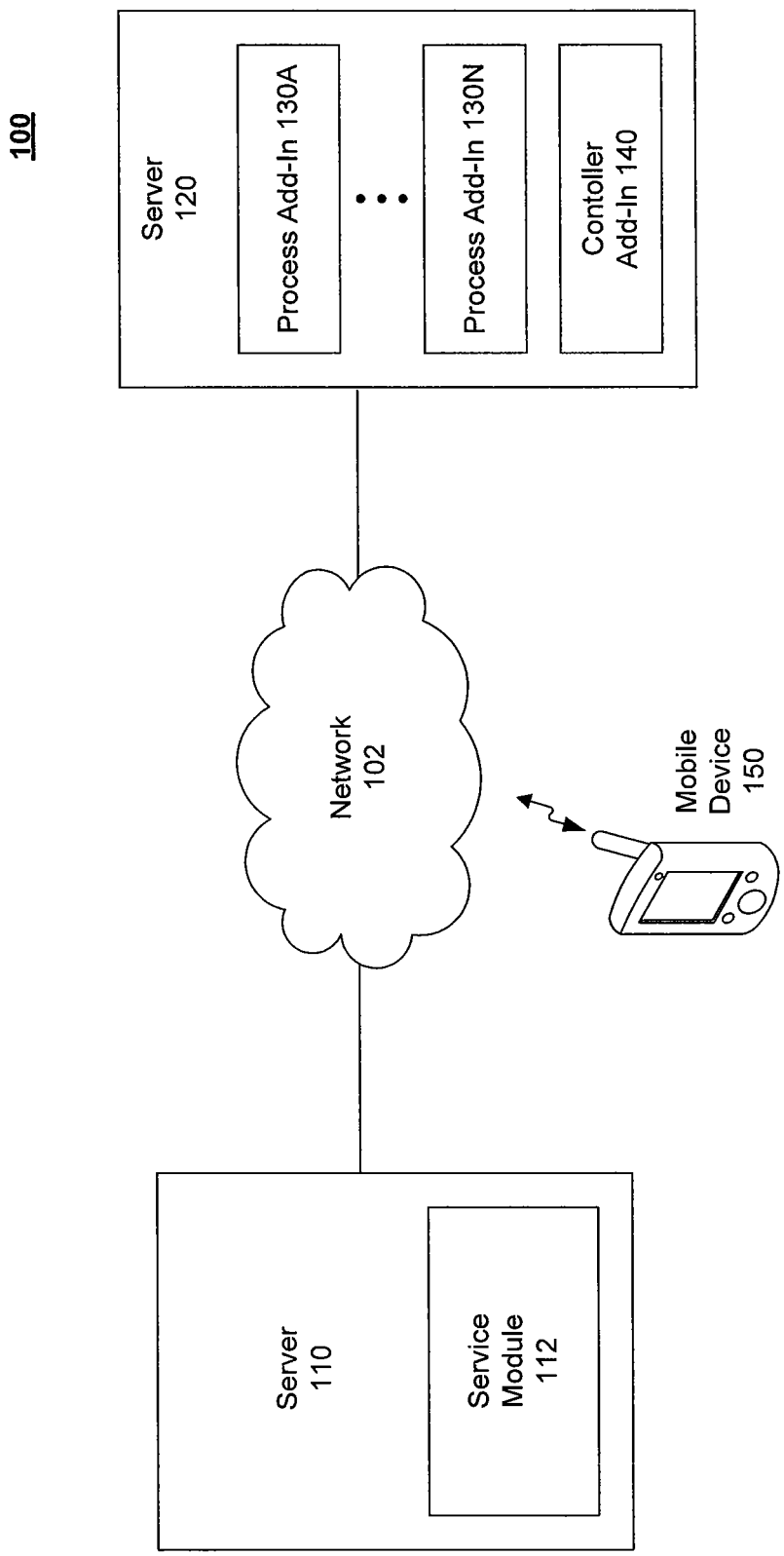
FIG. 1 is exemplary network architecture in which embodiments of the present invention, or portions thereof, are implemented.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Introduction

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the art that the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, and within the scope and spirit of the invention.

FIG. 1 is an example network architecture 100 in which embodiments of the present invention, or portions thereof, are implemented. Network architecture 100 includes server 110, server 120 and mobile device 150, connected through network 102, in accordance with an embodiment of the present invention.

In an embodiment, server 110 is a mobile office server that is associated with mobile device 150. As an example, not intended to limit the invention, server 110 may be configured to run the WINDOWS NT operating system provided by Microsoft, Inc. of Redmond, Wash. In an embodiment, server 110 can provide data to, and receive data from server 120. 'Data' as used herein can be any data or object, including, but not limited to, information in any form (text, video, audio, multimedia etc.) and applications.

In an embodiment, server 110 further includes service module 112. In an embodiment, service module 112 is configured to instantiate controller add-in 140 on server 120. The operation of service module 112 and controller add-in 140 is described further below. As described above, add-ins enable servers and applications to perform tasks that the servers and applications may not be originally configured to perform.

In an embodiment, server 120 facilitates the routing of data (e.g. email messages) via network 102. As an example, server 120 may receive an email from a user (not shown) and forward that email to mobile device 150. As an example, not intended to limit the invention, server 120 is an IBM LOTUS DOMINO server provided by IBM, Inc. of Armonk, N.Y.

Network 102 may include one or more networks, including but not limited to, a local area network, medium-area network, and/or wide-area network, such as, the Internet. Network 102, for example, may be a wired or wireless network that allows mobile device 150, server 110, and server 120 to communicate with each other. Network 102 can further support world-wide web protocols and services.

Mobile device 150 can receive data from server 110 and/or server 120 via network 102. Mobile device 150 can upload data to server 110 and server 120 for any given application or set of applications. For example, a calendar application might allow other users to add or make changes to appointments which are then stored on server 110. A user of mobile device 150 may also have added, deleted, or made changes to appointments within mobile device 150 itself. Upon synchronization, server 110 learns of the appointments made, changed, or deleted on mobile device 150, and mobile device 150 learns of appointments made, changed, or deleted on server 110. In accordance with an additional embodiment of the present invention, a partial synchronization is possible, whereby some subset of appointments may be exchanged. Although FIG. 1 illustrates a single mobile device 150 for clarity, it is to be appreciated that system 100 is scalable and a plurality of mobile devices can connect to server 110 and server 120 via network 102.

Process Add-Ins 130A-N

In an embodiment, server 120 includes a plurality of process add-ins 130A-N. In an embodiment, server 120 can use process add-ins 130A-N to perform tasks and processes it may not be originally configured to perform. In an embodiment, process add-ins 130A-N can perform several tasks and processes on server 110, including, but not limited to, performing database table updates at server 110.

In an embodiment, process add-ins 130A-N can be added to an initialization file (e.g. .INI file) associated with server 120.

As an example, when process add-ins 130A-N are added to an initialization file of server 120, the add-ins are initialized (or begin operation) when server 120 is started (i.e. boots up) and are terminated when server 120 stops operating (or boots down). Because process add-ins 130A-N are initialized and terminated by starting and stopping server 120, server 120 needs to be shut down to control process add-ins 130A-N. Furthermore, process add-ins 130A-N can be performing mission critical tasks on server 110, which is separate from server 120, and thus cannot be terminated directly by server 120. Such termination by server 120 could result in loss of data or corruption of data at server 110. In other words, because process add-ins 130A-N are performing tasks (e.g. database table updates) on server 110 it is necessary for server 110 to determine when process add-ins 130A-N can be terminated or instantiated.

In an embodiment process add-ins 130A-N can include an event listener add-in configured to detect events occurring at server 120 and provide notification of such events to mobile device 150. Such an event listener add-in may also queue a plurality of events for subsequent delivery to mobile device 150. Process add-ins 130A-N can also include a bridge agent add-in that receives events from mobile device 150 and provides these events to server 120. Such a bridge agent add-in may also be configured to update data stored at server 120 based on events received from mobile device 150.

Service Module 112 and Controller Add-In 140

In an embodiment, service module 112 is configured to monitor server 110 and instantiate controller add-in 140 on server 120 based on an operational status of server 110. As an example, such status can include a power on or power off status of server 110 or an upgrade status of server 110. An upgrade status can indicate if server 110 is to be upgraded. Furthermore, an operational status of server 110 can be based on one or more operational parameters of server 110. In an embodiment, not intended to limit the invention, to determine an operational status of server 110, service module 112 may check a status file or process that includes a time and date of a scheduled upgrade or a server shut down event. Other approaches for determining the status of server 110 will be apparent to persons skilled in the art, such as by accessing a background monitoring process. As an example, if service module 112 determines, using a status file or other means, that server 110 is to be turned off (or powered down), service module 112 can instantiate controller add-in 140 to terminate one or more process add-ins 130A-N. Such operation prevents process add-ins 130A-N from communicating with server 110 while it is being powered down and can prevent the loss or corruption of data at server 110.

In an embodiment, not intended to limit the invention, service module 112 can be instantiated by server 110 as a WINDOWS NT service. As an example, a NT service is a background process which is loaded by server 110 using a WINDOWS NT operating system. In an embodiment, service module 112 can be instantiated by server 110 when server 110 is powered on or 'boots up'.

In this way, embodiments of the invention overcome disadvantages of an approach where server 110 may have to be shut down for the purpose of terminating the operation of process add-ins 130A-N. Thus, embodiments of the invention allow server 120 to continue operating while more selectively terminating the operation of process add-ins 130A-N.

In an embodiment, when service module 112 determines that server 110 has powered back on (or resumed normal operation), service module 112 instantiates controller add-in 140 to resume operation of any terminated process add-ins 130A-N.

In this way, service module 112, located on server 110 and controller add-in 140, located on server 120, externally control the lifetime of process add-ins 130A-N resident on server 120.

In the network architecture illustrated in FIG. 1, a WINDOWS NT server process and an IBM LOTUS DOMINO server process can be instantiated at two different servers i.e. server 110 and server 120 respectively. However, it is to be appreciated that a single computing device or server can include both the WINDOWS NT server process and the IBM LOTUS DOMINO server process. In this exemplary scenario, the single computing device or server can include service module 112, controller add-in 140 and process add-ins 130A-N. Thus, in this example, when the WINDOWS NT server process needs to be shut down for upgrades or other tasks or reasons, the IBM LOTUS DOMINO server process hosting the process add-ins need not be shut down to prevent the process add-ins from communicating with the WINDOWS NT server process (or any other processes or servers). Instead, service module 112, resident on the WINDOWS NT server process, can terminate the process add-ins as needed. Because the IBM LOTUS DOMINO server process need not be shut down, any other applications executed by the IBM LOTUS DOMINO server process are not affected.

Figure 2:
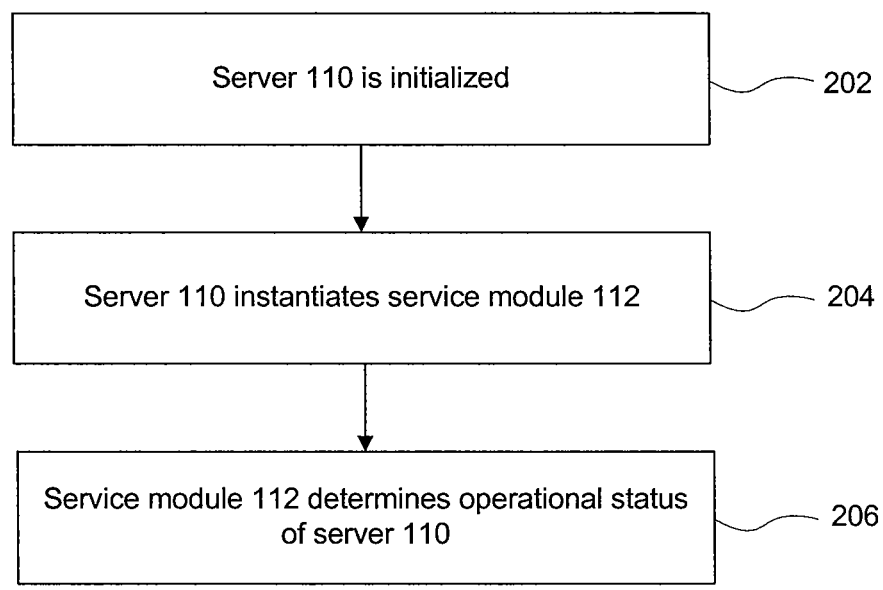
FIG. 2 is a flowchart illustrating an exemplary operation of a first server, according to an embodiment.

FIG. 2 is a flowchart illustrating an exemplary operation of server 110 according to an embodiment.

In step 202, server 110 is initialized or 'boots up'. As an example, such operation can also include a re-start of server 110.

In step 204, server 110 instantiates service module 112. As discussed above, and for example, service module 112 is an NT service loaded by server 110 using a WINDOWS NT operating system.

In step 206, service module 112 determines an operational status of server 110. As an example, determining such status can include, but is not limited to, determining if server 110 is to be upgraded, to be shut down or to be powered on. As discussed above, such status can also include one or more operational parameters associated with server 110.

Figure 3:
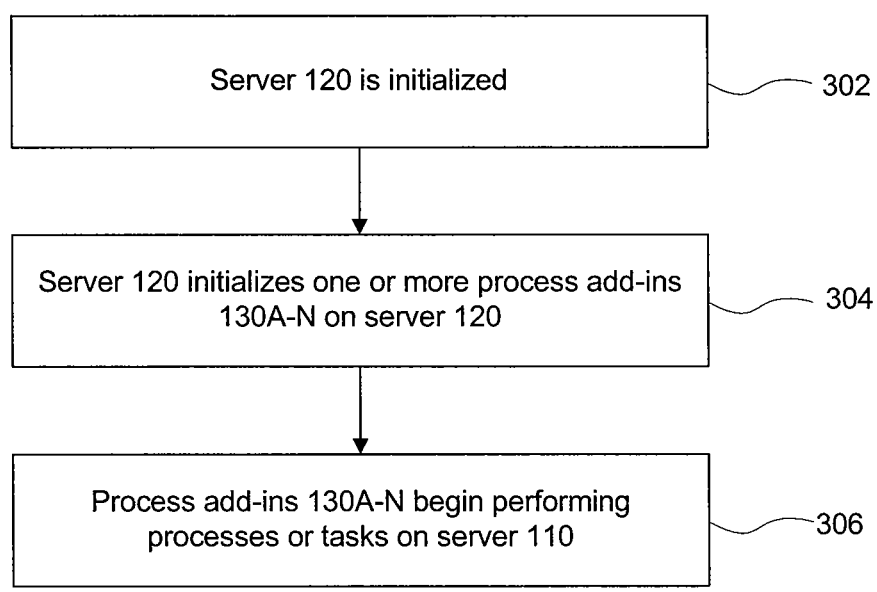
FIG. 3 is a flowchart illustrating an exemplary operation of a server configured to host add-ins, according to an embodiment.

FIG. 3 is a flowchart illustrating an operation of server 120, according to an embodiment.

In step 302, server 120 is initialized or 'boots up'. As an example, such operation can also include a re-start of server 120.

In step 304, server 120 initializes one or more process add-ins 130A-N on server 120. In an embodiment, process add-ins 130A-N can be added to an initialization file (e.g. .INI file) associated with server 120. As an example, when process add-ins 130A-N are added to an initialization file of server 120, the add-ins are initialized (or begin operation) when server 120 is started (i.e. boots up) and are terminated when server 120 boots down.

In step 306, process add-ins 130A-N begin performing tasks on server 110. As discussed above, such tasks can include, but are not limited to, updating database tables at server 110.

Figure 4:
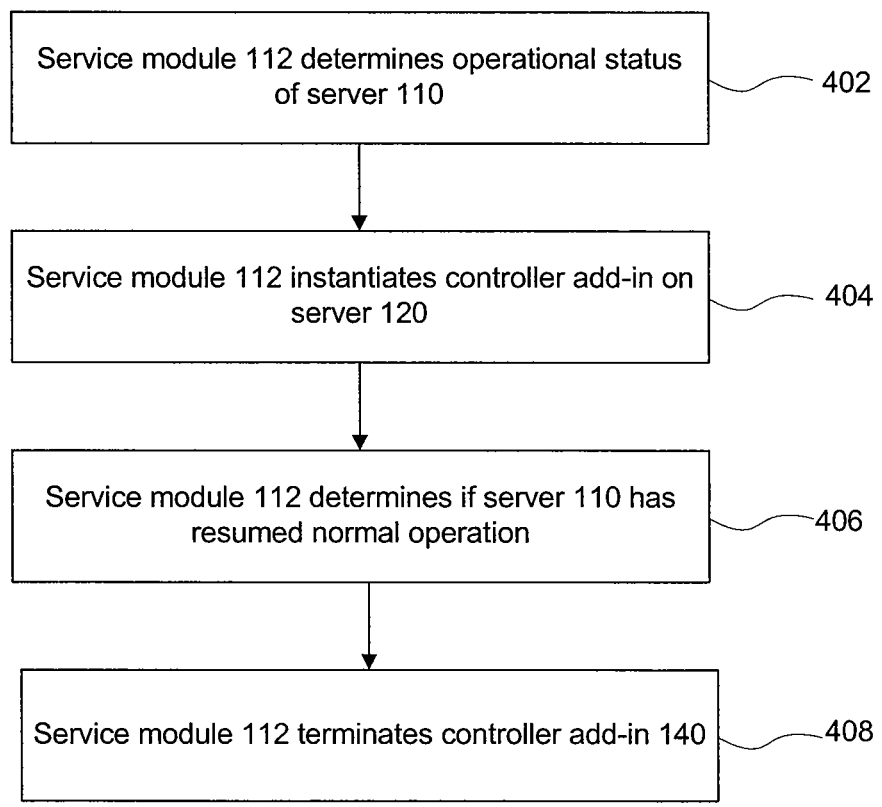
FIG. 4 is a flowchart illustrating an exemplary operation of a service module, according to an embodiment.

FIG. 4 is a flowchart illustrating an exemplary operation of service module 112, according to an embodiment.

In step 402, service module 112 determines an operational status of server 110. As an example, determining such status can include, but is not limited to, determining if server 110 is to be upgraded or shut down. As discussed above, such status can also include one or more operational parameters associated with server 110.

In step 404, service module 112 instantiates controller add-in 140 on server 120. In an embodiment, step 404 is performed based on the operational status of server determined in step 402. In an embodiment, controller add-in 140 is instantiated to control the lifetime of one or more process add-ins 130A-N at server 120.

In step 406, service module 112 determines if server 110 has resumed normal operation or if server 110 has been upgraded.

In step 408, service module 112 terminates controller add-in 140 based on step 406.

In this way, controller add-in 140 is instantiated for the purpose of controlling lifetime of add-ins 130A-N.

Figure 5:
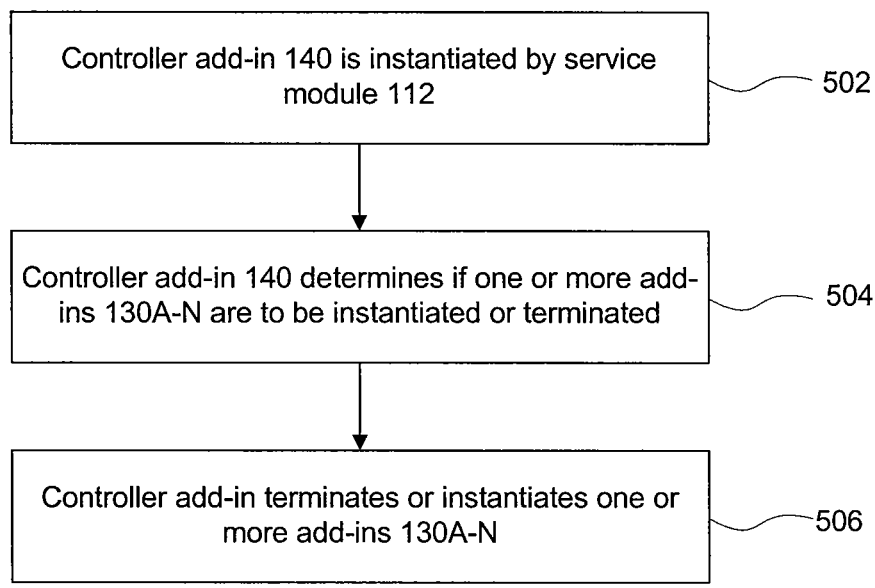
FIG. 5 is a flowchart illustrating an exemplary operation of a controller add-in, according to an embodiment.

FIG. 5 is a flowchart illustrating an exemplary operation of controller add-in 140, according to an embodiment.

In step 502, controller add-in 140 is instantiated by service module 112.

In step 504, controller add-in 140 determines if one or more process add-ins 130A-N are to be instantiated or terminated.

In step 506, controller add-in 140 terminates or instantiates one or more process add-ins 130A-N based on step 504. As an example, if server 110 is to be shut down for upgrades, controller add-in 140 can terminate operation of one or more process add-ins 130A-N. In another example, if server 110 has completed upgrades, controller add-in 140 can resume operation of one or more process add-ins 130A-N.

Exemplary Operation

As an illustrative example, consider a scenario where one or more dynamic link libraries (DLLs) are to be upgraded on server 110. DLLs are well known to those skilled in the art and are a form of shared application libraries. Furthermore, consider that process add-ins 130A-N are updating one or more database tables at server 110. In this scenario, and according to an embodiment, service module 112 in server 110 instantiates controller add-in 140 in server 120 to terminate operation of process add-ins 130A-N before server 110 is shut down for upgrades. In an embodiment, once the operation of one or more process add-ins 130A-N has been terminated by controller add-in 140, controller add-in 140 may itself be terminated by service module 112. Thus, in an embodiment, controller add-in 140 is instantiated for the purpose of controlling the lifetime of (i.e. instantiating or terminating) process add-ins 130A-N.

In this way, server 120, that hosts process add-ins 130A-N, need not be shut down to prevent the add-ins from communicating with server 110. Because server 120 need not be shut down, any other applications executing on server 120 are not affected.

Returning to the exemplary operation discussed above, once service module 112 determines that the DLLs have been upgraded and server 110 has resumed normal operation, service module 112 instantiates controller add-in 140 to resume operation of one or more process add-ins 130A-N. Once process add-ins 130A-N resume updating database tables on server 110, service module 112 may terminate controller add-in 140. In this way, controller add-in 140 performs the task of controlling the lifetime of process add-ins 130A-N. It is noted that the invention is not limited to add-ins, but is instead applicable to processes of any type.

Example Computer Embodiment

Figure 6:
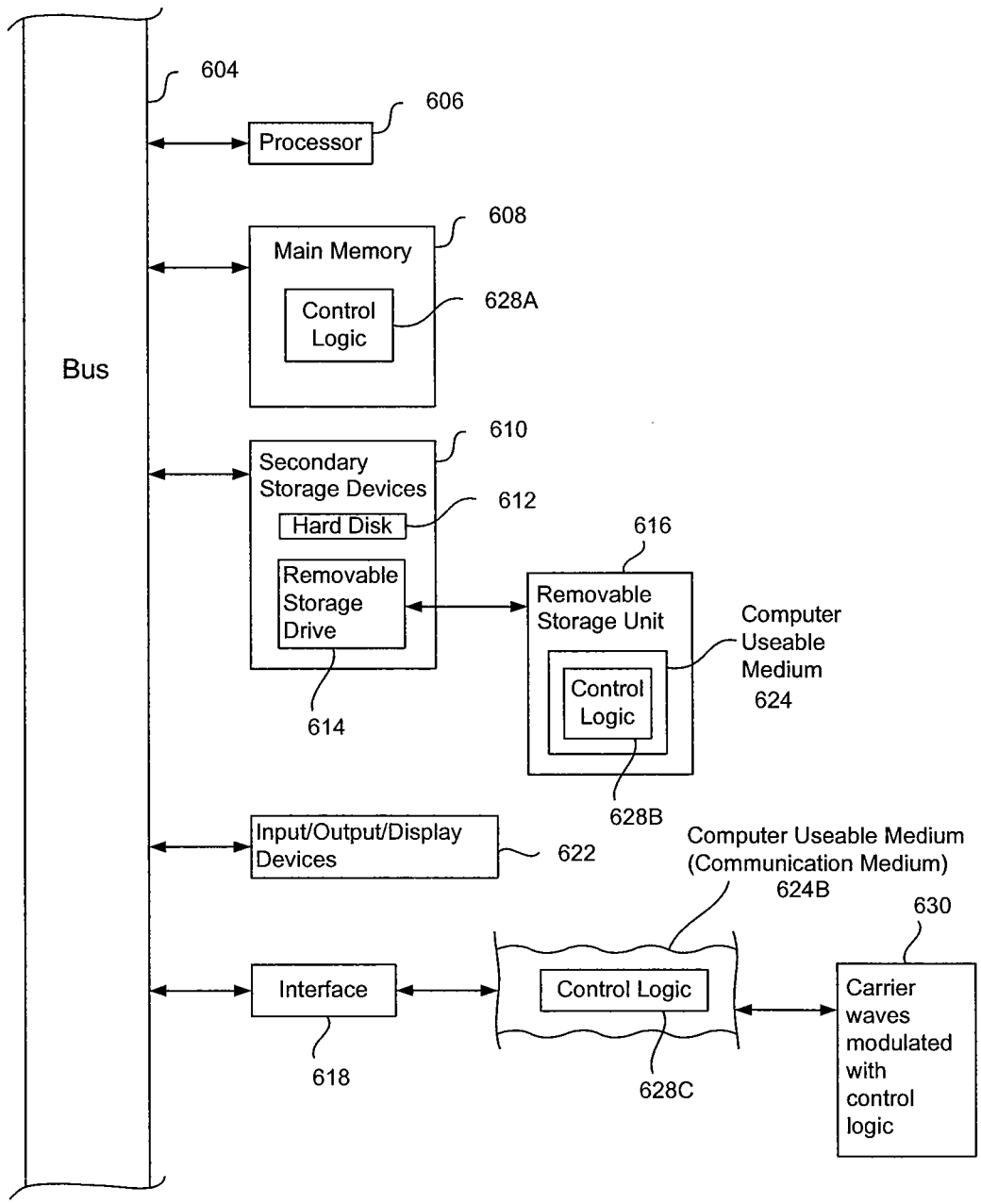
FIG. 6 depicts an example computer system in which embodiments of the present invention may be implemented.

In an embodiment of the present invention, the system and components of embodiments described herein are implemented using well known computers, such as computer 602 shown in FIG. 6. For example, server 110, server 120, controller add-in 140, service module 112 and process add-ins 130A-N can be implemented using computer(s) 602.

The computer 602 can be any commercially available and well known computer capable of performing the functions described herein, such as computers available from International Business Machines, Apple, Sun, HP, Dell, Compaq, Cray, etc.

The computer 602 includes one or more processors (also called central processing units, or CPUs), such as a processor 606. The processor 606 is connected to a communication bus 604.

The computer 602 also includes a main or primary memory 608, such as random access memory (RAM). The primary memory 608 has stored therein control logic 628A (computer software), and data.

The computer 602 also includes one or more secondary storage devices 610. The secondary storage devices 610 include, for example, a hard disk drive 612 and/or a removable storage device or drive 614, as well as other types of storage devices, such as memory cards and memory sticks. The removable storage drive 614 represents a floppy disk drive, a magnetic tape drive, a compact disk drive, an optical storage device, tape backup, etc.

The removable storage drive 614 interacts with a removable storage unit 616. The removable storage unit 616 includes a computer useable or readable storage medium 624 having stored therein computer software 628B (control logic) and/or data. Removable storage unit 616 represents a floppy disk, magnetic tape, compact disk, DVD, optical storage disk, or any other computer data storage device. The removable storage drive 614 reads from and/or writes to the removable storage unit 616 in a well known manner.

The computer 602 also includes input/output/display devices 622, such as monitors, keyboards, pointing devices, etc.

The computer 602 further includes a communication or network interface 618. The network interface 618 enables the computer 602 to communicate with remote devices. For example, the network interface 618 allows the computer 602 to communicate over communication networks or mediums 624B (representing a form of a computer useable or readable medium), such as LANs, WANs, the Internet, etc. The network interface 618 may interface with remote sites or networks via wired or wireless connections.

Control logic 628C may be transmitted to and from the computer 602 via the communication medium 624B. More particularly, the computer 602 may receive and transmit carrier waves (electromagnetic signals) modulated with control logic 630 via the communication medium 624B.

Any apparatus or manufacture comprising a computer useable or readable medium having control logic (software) stored therein is referred to herein as a computer program product or program storage device. This includes, but is not limited to, the computer 602, the main memory 608, secondary storage devices 610, the removable storage unit 616 and the carrier waves modulated with control logic 630. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer implemented method for controlling server add-ins, comprising:
    instantiating a service module at a first server;
    instantiating, using said service module, a process controller at a second server;
    automatically determining a first operational status of said first server;
    automatically sending an instruction, using said service module, to said process controller to control a first process at said second server, wherein said instruction is based on said automatically determined first operational status of said first server;
    determining a second operational status of said first server;
    automatically sending an additional instruction, using said service module, said process controller to control said first process at said second server, wherein said additional instruction is based on said second operational status; and
    terminating said process controller.

2. The method of claim 1, wherein terminating comprises:
    terminating, by the service module, said process controller after controlling said first process.

3. The method of claim 2, wherein instantiating said process controller comprises instantiating a process controller add-in.

4. The method of claim 1, wherein automatically determining said first operational status of said first server comprises automatically determining the first operational status of said first server When said one or more processes operating on said first server are to be at least one of terminated or instantiated.

5. The method of claim 1, wherein automatically determining said first operational status of said first server comprises automatically determining if said first server is to be shut down.

6. The method of claim 1, wherein automatically determining said first operational status of said first server comprises automatically determining if an upgrade is to be performed at said first server.

7. The method of claim 1, wherein automatically sending the instruction to control said first process comprises automatically sending an instruction to terminate said first process.

8. A computer-based system for controlling server add-ins, comprising:
    a processor;
    a memory; and
    a service module at a first server, wherein the service module is configured, using the processor and the memory, to:
        instantiate a process controller at a second server,
        automatically determine a first operational status of the first server,
        automatically send an instruction to said process controller to control a first process at said second server, wherein said instruction is based on said automatically determined first operational status of said first server,
        determine a second operational status of said first server,
        automatically send an additional instruction to said process controller to control said first process at said second server, wherein said additional instruction is based on said second operational status, and
        terminate said process controller.

9. The system of claim. 8, wherein said service module is further configured to terminate said process controller after controlling said first process.

10. The system of claim 9, wherein said process controller is a controller add-in, and said processes are process add-ins.

11. The system of claim 8, wherein said service module is further configured to automatically determine said first operational status by determining conditions that comprise whether said first server is shut down.

12. The system of claim 8, wherein said service module is further configured to automatically determine said first operational status by determining conditions that comprise whether an upgrade is to be performed at said first server.

13. The system of claim 8, wherein said service module is further configured to send an instruction to terminate and send an instruction to instantiate said first process.

14. An article of manufacture comprising a non-transitory computer-readable medium having instructions stored thereon that, if executed by a computing device, cause said computing device to perform operations comprising:
   instantiating a service module at a first server;
   instantiating, using said service module, a process controller at a second server;
   automatically determining a first operational status of said first server;
   automatically sending an instruction, using said service module, to said process controller to control a first process at said second server, wherein said instruction is based on said automatically determined first operational status of said first server;
   determine a second operational status of said first server;
   automatically sending an additional instruction, using said service module, to said process controller to control said first process at said second server, wherein said additional instruction is based on said second operational status: and
   terminating said process controller.

15. The article of manufacture of claim 14, wherein terminating comprises:
   terminating, by the service module, said process controller after controlling said first process.

16. The article of manufacture of claim 15, Wherein instantiating said process controller comprises instantiating a process controller add-in.

17. The article of manufacture of claim 14, wherein automatically determining said first operational status of said first server comprises automatically determining the first operational status of said first server when said one or more processes operating on said server are to be at least one of terminated or instantiated.

18. The article of manufacture of claim 14, wherein automatically determining said first operational status of said first server comprises automatically determining if said first server is to be shut down.

19. The article of manufacture of claim 14, wherein automatically determining said first operational status of said first server comprises automatically determining if an upgrade is to be performed at said first server.

20. The article of manufacture of claim 14, wherein automatically sending the instruction to control said first process comprises automatically sending an instruction to terminate said first process.

* * * * *